US012463194B2

(12) United States Patent
Rangasamy et al.

(10) Patent No.: US 12,463,194 B2
(45) Date of Patent: Nov. 4, 2025

(54) INLINE CONTACT PRE-LITHIATION

(71) Applicant: Elevated Materials US LLC, Santa Clara, CA (US)

(72) Inventors: Ezhiylmurugan Rangasamy, San Jose, CA (US); Jean Delmas, Santa Clara, CA (US); Bernard Frey, Livermore, CA (US); Subramanya P. Herle, Mountain View, CA (US); Girish Kumar Gopalakrishnan Nair, San Jose, CA (US)

(73) Assignee: Elevated Materials US LLC, Santa Clara, CA (US)

( * ) Notice: Subject to any disclaimer, the term of this patent is extended or adjusted under 35 U.S.C. 154(b) by 72 days.

(21) Appl. No.: 17/394,176

(22) Filed: Aug. 4, 2021

(65) Prior Publication Data

US 2022/0052307 A1  Feb. 17, 2022

Related U.S. Application Data

(60) Provisional application No. 63/064,123, filed on Aug. 11, 2020.

(51) Int. Cl.
 *H01M 4/04* (2006.01)
 *H01M 4/133* (2010.01)
 (Continued)

(52) U.S. Cl.
 CPC ....... *H01M 4/0435* (2013.01); *H01M 4/0402* (2013.01); *H01M 4/133* (2013.01);
 (Continued)

(58) Field of Classification Search
 CPC .. H01M 4/0435; H01M 4/0402; H01M 4/133; H01M 4/382; H01M 4/583;
 (Continued)

(56) References Cited

U.S. PATENT DOCUMENTS 4,002,492 A   1/1977 Rao
5,366,829 A   11/1994 Saidi
(Continued)

FOREIGN PATENT DOCUMENTS

CN   109455554 A  *  3/2019 ............. B65H 18/10
CN   110010844 A     7/2019
(Continued)

OTHER PUBLICATIONS

EPO English Machine Translation of KR 2018061671, originally published to Cho I on Jun. 8, 2018 (Year: 2018).*
(Continued)

*Primary Examiner* — Niki Bakhtiari
(74) *Attorney, Agent, or Firm* — Lee & Hayes, P.C.

(57) ABSTRACT

A method and system for fabricating a pre-lithiated electrode structure are provided. The method includes supplying a first continuous web substrate from an unwinder roller to a winder roller. The first continuous web substrate includes a layer of lithium metal. The method further includes supplying a second continuous web substrate comprising a layer of patterned anode material adjacent to the first continuous web substrate. The first continuous web substrate and the second continuous web substrate are wound together on the unwinder roller, wherein a surface of the layer of anode material contacts a surface of the layer of lithium metal. Pressure is applied to the first continuous web substrate and the second continuous web substrate to pre-lithiate the patterned anode material, wherein applying pressure comprises tensioning at least one of the unwinder roller and the winder roller.

21 Claims, 11 Drawing Sheets

(51) Int. Cl.
*H01M 4/38* (2006.01)
*H01M 4/583* (2010.01)
*H01M 10/0525* (2010.01)
*H01M 4/02* (2006.01)

(52) U.S. Cl.
CPC ........... *H01M 4/382* (2013.01); *H01M 4/583* (2013.01); *H01M 10/0525* (2013.01); *H01M 2004/027* (2013.01); *H01M 2004/028* (2013.01)

(58) Field of Classification Search
CPC ....... H01M 10/0525; H01M 2004/027; H01M 2004/028
See application file for complete search history.

(56) References Cited

U.S. PATENT DOCUMENTS

| | | | |
|---|---|---|---|
| 6,761,744 | B1 | 7/2004 | Tsukamoto et al. |
| 8,465,554 | B2 | 6/2013 | Choi et al. |
| 8,685,117 | B2 | 4/2014 | Tasaki et al. |
| 9,093,228 | B2 | 7/2015 | Mizukami et al. |
| 9,711,297 | B2 | 7/2017 | Raman et al. |
| 9,958,508 | B2 | 5/2018 | Okayama et al. |
| 2001/0047739 | A1* | 12/2001 | Archambeault ......... C09C 1/62 106/404 |
| 2002/0012846 | A1 | 1/2002 | Skotheim et al. |
| 2004/0179328 | A1 | 9/2004 | Ando et al. |
| 2005/0191547 | A1* | 9/2005 | Konishiike ......... H01M 10/052 429/231.95 |
| 2006/0006063 | A1 | 1/2006 | Tanaka et al. |
| 2006/0057433 | A1 | 3/2006 | Ando et al. |
| 2007/0204457 | A1* | 9/2007 | Sato ................... H01M 10/058 29/623.5 |
| 2008/0311363 | A1 | 12/2008 | Haskett et al. |
| 2009/0148773 | A1 | 6/2009 | Volkov et al. |
| 2009/0174986 | A1 | 7/2009 | Matsui et al. |
| 2009/0197171 | A1 | 8/2009 | Nakazato et al. |
| 2009/0260528 | A1 | 10/2009 | Baccini et al. |
| 2009/0280410 | A1 | 11/2009 | Zaguib et al. |
| 2009/0311606 | A1 | 12/2009 | Fukuoka et al. |
| 2010/0120179 | A1 | 5/2010 | Zhamu et al. |
| 2010/0216027 | A1 | 8/2010 | Fujii |
| 2010/0255356 | A1 | 10/2010 | Fujii et al. |
| 2011/0143019 | A1 | 6/2011 | Mosso et al. |
| 2011/0300290 | A1 | 12/2011 | Kim et al. |
| 2014/0093782 | A1 | 4/2014 | Gardner et al. |
| 2014/0272594 | A1 | 9/2014 | Safont Sempere et al. |
| 2015/0158048 | A1 | 6/2015 | Ries et al. |
| 2016/0126023 | A1 | 5/2016 | Cao et al. |
| 2016/0181594 | A1 | 6/2016 | Balogh et al. |
| 2017/0103856 | A1 | 4/2017 | Zhamu et al. |
| 2017/0324073 | A1 | 11/2017 | Herle |
| 2017/0365854 | A1 | 12/2017 | Gopalakrishnannair et al. |
| 2019/0044137 | A1 | 2/2019 | Zhamu et al. |
| 2019/0393480 | A1 | 12/2019 | Brevnov |
| 2020/0136198 | A1 | 4/2020 | Kasumzade |
| 2020/0165721 | A1 | 5/2020 | Morrison et al. |
| 2020/0176809 | A1* | 6/2020 | Tanaka ................. H01M 50/46 |
| 2020/0185161 | A1 | 6/2020 | Herle |
| 2020/0303728 | A1 | 9/2020 | Kim et al. |
| 2021/0135274 | A1 | 5/2021 | Chae et al. |

FOREIGN PATENT DOCUMENTS

| | | | | |
|---|---|---|---|---|
| EP | 1895553 | A1 | 3/2008 | |
| JP | 2003068286 | A | 3/2003 | |
| JP | 2007214109 | A | 8/2007 | |
| JP | 2016025060 | A | 2/2016 | |
| JP | 2018142528 | A | 9/2018 | |
| KR | 2018061671 | A * | 6/2018 | ............ H01G 11/06 |
| KR | 20180112659 | A | 10/2018 | |
| WO | 2017/131997 | A1 | 8/2017 | |
| WO | 2017/202444 | A1 | 11/2017 | |
| WO | 201905963 | A1 | 1/2019 | |

OTHER PUBLICATIONS

EPO English Machine Translation of CN 109455554 originally published to Chen Yongtao on Mar. 12, 2019 (Year: 2019).*
International Search Report and Written Opinion dated Nov. 24, 2021 for Application No. PCT/US2021044537.
Aida et al. "An Advanced Hybrid Electrochemical Capacitor That Uses a Wide Potential Range at the Positive Electrode," Electrochemical and Solid State Letters, Jan. 2006, vol. 9, No. 12, pp. A534-A536.
Cai et al. ""Performance of lithium-ion capacitors using pre-lithiated multiwalled carbon nanotubes/graphite composite 2 iis negative electrode, Journal of Materials Science, Jan. 2018, vol. 53, No. 1, pp. 53: 749-758, <https://doi.t>rg/10 . 1007 /s 10853-017-1524-5>.
Hatozaki ""Recent Progress in Lithium Ion Capacitor Technology,"" Proceedings of 17th International Seminar on 3 Double-layer Capacitors and Hybrid Energy Storage Devices, Deerfield Beach, Florida, USA, Dec. 2007, t>p. 156-170.
Hatozaki "Improvement of Lithium Ion Capacitor with New Electrode Materials," Proceedings of the 18th International 4th Seminar on Double-layer Capacitors & Hybrid Energy Storage Devices, Deerfield Beach, Florida, USA, Dec. 9, 2008, pp. 96-112.
International Search Report and the Written Opinion for International Application No. PCT/US2019/051921 dated Jan. 3, 2020, 11 pages.
Office Action for Japanese Application No. 2023-508560, dated Aug. 12, 2025, 14 pages.

* cited by examiner

INLINE CONTACT PRE-LITHIATION

CROSS-REFERENCE TO RELATED APPLICATIONS

This application claims benefit of U.S. provisional patent application Ser. No. 63/064,123, filed Aug. 11, 2020, which is incorporated herein by reference in its entirety.

BACKGROUND

Field

Implementations described herein generally relate to pre-lithiated electrodes, high performance electrochemical cells and batteries including the aforementioned pre-lithiated electrodes, and methods and continuous web processing systems for fabricating the same.

Description of the Related Art

Lithium (Li) ion batteries have played a role in the development of current generation mobile devices, microelectronics and electric vehicles. A typical Li-ion battery is made of a positive electrode (cathode), a negative electrode (anode), an electrolyte to conduct ions, a porous separator membrane, which is generally an electrical insulator, between the two electrodes to keep them physically apart, and a surrounding packaging.

Typically, lithium batteries do not contain any metallic lithium for safety reasons but instead use a graphitic material as the anode. However, the use of graphite, which can be charged up to the limit composition $LiC_6$, results in a much lower capacity, in comparison with the use of silicon-blended graphite. Currently, the industry is moving away from graphitic-based anodes to silicon-blended graphite to increase energy cell density. However, silicon blended graphite anodes suffer from first cycle irreversible capacity loss (IRC). Li-ion battery specific energy and energy density appreciably declines due to active lithium loss during the first cycle charge when approximately five to twenty percent of the lithium from the cathode is consumed by solid electrolyte interphase formation ("SEI") at the anode.

Anode lithiation or "pre-lithiation" prior to the first cycle charge is a common strategy for compensating active lithium loss. Furthermore, pre-lithiation provides other performance and reliability advantages to Li-ion battery performance. For example, pre-lithiation can decrease Li-ion battery impedance thereby improving rate capability. In addition, for silicon-based anodes, pre-lithiation can mitigate silicon cracking and pulverization by pre-expanding the silicon to enhance anode mechanical stability.

Various anode pre-lithiation methods exist including chemical pre-lithiation, electrochemical pre-lithiation, and stabilized lithium metal powder ("SLMP"). However, these various anode pre-lithiation methods have long reaction times and inherent safety risks, which are unsuitable for volume Li-ion battery manufacturing.

Therefore, there is a need for methods and systems for pre-lithiation of electrode materials.

SUMMARY

Implementations described herein generally relate to pre-lithiated electrodes, high performance electrochemical cells and batteries including the aforementioned pre-lithiated electrodes, and methods and continuous web processing systems for fabricating the same.

In one aspect, a method of fabricating a pre-lithiated electrode is provided. The method includes disposing a carrier substrate comprising a layer of lithium metal adjacent to a prefabricated electrode comprising a layer of anode material. The method further includes contacting a surface of the layer of anode material with a surface of the layer of lithium metal. The method further includes calendering the layer of lithium metal and the prefabricated electrode together.

Implementations of the method can include one or more of the following. The carrier substrate is separated from the surface of the layer of anode material to form the pre-lithiated electrode. Calendering the layer of lithium metal includes applying uniform pressure to a back surface of the carrier substrate. The uniform pressure is a pressure ranging from about 0.3 MPa to about 10 MPa. Calendering the layer of lithium metal and the prefabricated electrode together includes transferring the layer of lithium metal and the prefabricated electrode through a pair of calendering rollers. The method further includes heating at least one of the carrier substrate comprising the layer of lithium metal or the prefabricated electrode to a temperature. The temperature is within a range from about 50 degrees Celsius to about 180 degrees Celsius. The prefabricated electrode is a negative electrode including a carbonaceous material, silicon, tin, or combinations thereof. The carbonaceous material is selected from natural graphite, artificial graphite, or a combination thereof. The layer of lithium metal has a thickness from about 1 micron to about 50 microns, for example, from about 20 microns to about 50 microns; from about 1 micron to about 20 microns, or from about 10 microns to about 30 microns. Calendering the layer of lithium metal and the prefabricated electrode together is performed in an atmosphere comprising a noble gas. Calendering the layer of lithium metal and the prefabricated electrode together is performed in a vacuum environment. The method further includes incorporating the pre-lithiated electrode into an electrochemical cell including a positive electrode, a separator, and an electrolyte. A lithium-ion battery cell including a pre-lithiated electrode formed according to the methods described herein, has a positive electrode comprising oxides of a transition metal, and an electrolyte, wherein the electrolyte is selected from a solid electrolyte, a liquid electrolyte, or a polymer electrolyte. The pre-lithiated electrode and the positive electrode are in a fully charged position.

In another aspect, a lithium-ion battery cell including a pre-lithiated electrode formed according to the method described herein is provided. The lithium-ion battery cell further includes a positive electrode including oxides of a transition metal, and an electrolyte, wherein the electrolyte is selected from a solid electrolyte, a liquid electrolyte, or a polymer electrolyte.

Implementations can include one or more of the following. The pre-lithiated electrode and the positive electrode are in a fully charged position. The fully charged position of the pre-lithiated electrode is further defined as the pre-lithiated electrode being substantially or completely lithiated and the fully charged position of the positive electrode is further defined as the positive electrode being substantially or completely delithiated.

In yet another aspect, a method of fabricating a pre-lithiated electrode is provided. The method includes supplying a first continuous web substrate from an unwinder roller to a winder roller. The method further includes supplying a second continuous web substrate comprising a layer of patterned anode material adjacent to the first continuous web substrate. The method further includes winding the first continuous web substrate and the second continuous web substrate together on the unwinder roller such that a surface of the layer of anode material contacts a surface of the layer of lithium metal. The method further includes applying pressure to the first continuous web substrate and the second continuous web substrate to pre-lithiate the patterned anode material, wherein applying pressure comprises tensioning at least one of the unwinder roller and the winder roller.

Implementations can include one or more of the following potential advantages. The first continuous web substrate is separated from the surface of the layer of patterned anode material to form the pre-lithiated electrode. Tensioning includes applying a pressure ranging from about 0.3 MPa to about 10 MPa. The method further includes heating at least one of the first continuous substrate comprising the layer of lithium metal or the second continuous substrate to a temperature. The temperature is within a range from about 50 degrees Celsius to about 180 degrees Celsius. The layer of patterned anode material is a carbonaceous material, silicon, tin, or a combination thereof. The carbonaceous material is selected from natural graphite, artificial graphite, or a combination thereof. The layer of lithium metal has a thickness from about 1 micron to about 50 microns, for example, from about 20 microns to about 50 microns; from about 1 micron to about 20 microns, or from about 10 microns to about 30 microns. Applying pressure to the first continuous web substrate and the second continuous web substrate is performed in an atmosphere comprising a noble gas. Applying pressure to the first continuous web substrate and the second continuous web substrate is performed in a vacuum environment. The method further includes incorporating the pre-lithiated electrode into an electrochemical cell including a positive electrode, a separator, and an electrolyte.

In yet another aspect, a coating system operable to form a pre-lithiated electrode is provided. The system includes a roll-to-roll system operable to transport a continuous sheet of material through one or more processing chambers. The one or more processing chambers include a pre-lithiation module that defines a processing region and are adapted to process the continuous sheet of material. The pre-lithiation module includes an unwinder operable to supply a continuous carrier substrate, a lithium deposition region operable to deposit a lithium film on the carrier substrate, a winder operable to wind up or rewind the processed carrier substrate, and a prefabricated electrode supply roll, which supplies a prefabricated electrode to be pre-lithiated by the lithium film on the carrier substrate. The prefabricated electrode supply roll is positioned adjacent to the winder such that the prefabricated electrode and the lithium film on the carrier substrate are compressed between the winder and prefabricated electrode supply roll when the prefabricated electrode and the lithium film contact each other.

Implementations can include one or more of the following potential advantages. The coating system can include a first set of calendering rollers operable to compress the lithium film on the carrier substrate.

In yet another aspect, a non-transitory computer readable medium has stored thereon instructions, which, when executed by a processor, causes the process to perform operations of the above apparatus and/or method.

BRIEF DESCRIPTION OF THE DRAWINGS

So that the manner in which the above-recited features of the present disclosure can be understood in detail, a more particular description of the implementations, briefly summarized above, can be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

Figure 1A:
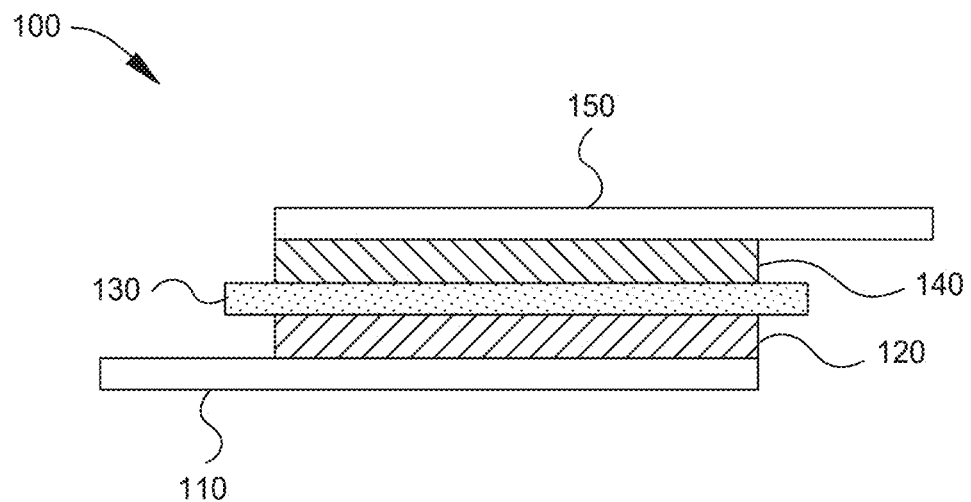
FIG. 1A illustrates a cross-sectional view of one example of an energy storage device including a pre-lithiated electrode structure formed according to an aspect of the present disclosure.

To facilitate understanding, identical reference numerals have been used, where possible, to designate identical elements that are common to the figures. It is contemplated that elements and features of one implementation can be beneficially incorporated in other implementations without further recitation.

DETAILED DESCRIPTION

The following disclosure describes pre-lithiated electrodes, high performance electrochemical cells and batteries including the aforementioned pre-lithiated electrodes, and methods and continuous web processing systems for fabricating the same. Certain details are set forth in the following description and in FIGS. 1A-12B to provide a thorough understanding of various implementations of the disclosure. Other details describing well-known structures and systems often associated with electrochemical cells and batteries are not set forth in the following disclosure to avoid unnecessarily obscuring the description of the various implementations.

Many of the details, dimensions, angles and other features shown in the Figures are merely illustrative of particular implementations. Accordingly, other implementations can have other details, components, dimensions, angles and features without departing from the spirit or scope of the present disclosure. In addition, further implementations of the disclosure can be practiced without several of the details described below.

Implementations described herein will be described below in reference to a roll-to-roll coating system. The apparatus description described herein is illustrative and should not be construed or interpreted as limiting the scope of the implementations described herein. It should also be understood that although described as a roll-to-roll process, the implementations described herein can be performed on discrete substrates.

Implementations described herein include pre-lithiation processes for pre-lithiation of coated electrodes (negative, positive) used in the Li-ion batteries. The pre-lithiation processes described herein are applicable to Li-ion batteries using solid electrolytes (e.g., solid-state batteries) as well as Li-ion batteries, which use liquid or polymer electrolytes.

In one aspect of the present disclosure, a method and system for roll-to-roll pre-lithiation of anode materials with a lithium coated web by way of direct contact is provided. It has been found by the inventors that direct contact is an effective way to pre-lithiate the anode material as this creates excellent surface contact between the lithium and the anode layer. In contrast, pre-lithiation using lithium in vapor phase is extremely reactive and could subject a substrate layer constituent (such as binder material) to chemical reduction, which adversely affects the integrity of the anode material. As described herein, by utilizing a pre-coated lithium substrate or carrier substrate, the activity of lithium is substantially reduced since lithium is present in solid phase rather than vapor phase. Not to be bound by theory, but it is believed that the driving force for the pre-lithiation process described herein is the chemical potential difference between the anode material and lithium metal. In addition, the method and systems described herein can be slotted into current battery production lines.

In one implementation, the residence time for pre-lithiation of the coated electrodes described herein is controlled and shortened by controlling at least one of temperature and pressure. Pre-lithiation of coated electrodes allows for, among other things, an increase in the Li-ion battery energy density (kWh), and reduction of the cathodic coating loading for the anode/cathode balancing, specifically the costly elements of cobalt and nickel. Thus, the pre-lithiation process described herein has a direct impact on the main figure of merit, cost per kWh, used in the Li-ion battery manufacturing. The pre-lithiation process described herein is suitable for any coated negative or positive electrodes. The pre-lithiation processes described herein provide battery manufacturers with greater flexibility in cell balancing, independently matching reversible anode/cathode capacities and irreversible anode/cathode capacities.

It is noted that while the particular substrate on which some implementations described herein can be practiced is not limited, it is particularly beneficial to practice the implementations on flexible substrates, including for example, web-based substrates, panels and discrete sheets. The substrate can also be in the form of a foil, a film, or a thin plate.

It is also noted here that a flexible substrate or web as used within the implementations described herein can typically be characterized in that it is bendable. The term "web" can be synonymously used to the term "strip" or the term "flexible substrate." For example, the web as described in implementations herein can be a foil.

It is further noted that in some implementations where the substrate is a vertically oriented substrate, the vertically oriented substrate can be angled relative to a vertical plane. For example, in some implementations, the substrate can be angled from between about 1 degree to about 20 degrees from the vertical plane. In some implementations where the substrate is a horizontally oriented substrate, the horizontally oriented substrate can be angled relative to a horizontal plane. For example, in some implementations, the substrate can be angled from between about 1 degree to about 20 degrees from the horizontal plane. As used herein, the term "vertical" is defined as a major surface or deposition surface of the flexible conductive substrate being perpendicular relative to the horizon. As used herein, the term "horizontal" is defined as a major surface or deposition surface of the flexible conductive substrate being parallel relative to the horizon.

It is further noted that in the present disclosure, a "roll" or a "roller" can be understood as a device, which provides a surface, with which a substrate (or a part of a substrate) can be in contact during the presence of the substrate in the processing system. At least a part of the "roll" or "roller" as referred to herein can include a circular-like shape for contacting the substrate to be processed or already processed. In some implementations, the "roll" or "roller" can have a cylindrical or substantially cylindrical shape. The substantially cylindrical shape can be formed about a straight longitudinal axis or can be formed about a bent longitudinal axis. According to some implementations, the "roll" or "roller" as described herein can be adapted for being in contact with a flexible substrate. For example, a "roll" or "roller" as referred to herein can be a guiding roller adapted to guide a substrate while the substrate is processed (such as during a deposition process) or while the substrate is present in a processing system; a spreader roller adapted for providing a defined tension for the substrate to be coated; a deflecting roller for deflecting the substrate according to a defined travelling path; a processing roller for supporting the substrate during processing, such as a process drum, e.g. a coating roller or a coating drum; an adjusting roller, a supply roll, a take-up roll or the like. The "roll" or "roller" as described herein can comprise a metal. In one implementation, the surface of the roller device, which is to be in contact with the substrate can be adapted for the respective substrate to be coated. Further, it is to be understood that according to some implementations, the rollers as described herein can be mounted to low friction roller bearings, particularly with a dual bearing roller architecture. Accordingly, roller parallelism of the transportation arrangement as described herein can be achieved and a transverse substrate "wandering" during substrate transport can be eliminated.

FIG. 1A illustrates a cross-sectional view of one example of an energy storage device 100 including a pre-lithiated electrode structure formed according to an aspect of the present disclosure. The energy storage device 100 can be a Li-ion energy storage device that uses solid electrolytes (e.g., a solid-state battery) as well as a Li-ion energy storage device, which uses a liquid or polymer electrolyte. The energy storage device 100 includes a positive current collector 110, a positive electrode 120, a separator 130, a negative electrode 140, and a negative current collector 150. At least one of the positive electrode 120 and the negative electrode 140 are pre-lithiated according to aspects described herein. Note in FIG. 1A that the current collectors are shown to extend beyond the stack, although it is not necessary for the current collectors to extend beyond the stack, the portions extending beyond the stack can be used as tabs.

The current collectors 110, 150, on positive electrode 120 and negative electrode 140, respectively, can be identical or different electronic conductors. Examples of metals that the current collectors 110, 150 can be comprised of include aluminum (Al), copper (Cu), zinc (Zn), nickel (Ni), cobalt (Co), tin (Sn), silicon (Si), manganese (Mn), magnesium (Mg), alloys thereof, or combinations thereof. In one example, at least one of the current collectors 110, 150 is perforated. Furthermore, current collectors can be of any form factor, shape, and micro/macro structure including, for example, metallic foil, sheets, or plates. Generally, in prismatic cells, tabs are formed of the same material as the current collector and can be formed during fabrication of the stack, or added later. In one example, all components except current collectors 110 and 150 contain Li-ion electrolytes.

The negative electrode 140 or anode can be any anode material compatible with the positive electrode 120. The negative electrode 140 can be pre-lithiated according to the implementations described herein. The negative electrode 140 can be patterned. The negative electrode 140 can have an energy capacity greater than or equal to 372 mAh/g, greater than or equal to 1,000 mAh/g, greater than or equal to 3,000 mAh/g, or greater than or equal to 4,000 mAh/g. In one aspect, the negative electrode 140 includes intercalation compounds containing lithium or insertion compounds containing lithium. In one aspect, the negative electrode can be constructed from graphite, silicon, or combinations thereof. The negative electrode 140 can be constructed from a carbonaceous material, for example, natural graphite or artificial graphite, partially graphitized or amorphous carbon, petroleum, coke, needle coke, and various mesophases, silicon-containing graphite, silicon, nickel, copper, tin, indium, aluminum, silicon, oxides thereof, combinations thereof, or a mixture of a lithium metal and/or lithium alloy and materials such as carbon, for example, coke or graphite, nickel, copper, tin, indium, aluminum, silicon, oxides thereof, or combinations thereof. In one example, the negative electrode 140 is constructed from silicon-graphite.

The material that forms the negative electrode can be in disperse form such as powders, fibers, or flakes. In some implementations where the negative electrode is in disperse form, the negative electrode 140 can be manufactured by any method known in the art such as by preparing slurry from a carbonaceous powder and a binder agent, applying the slurry onto/into a current-collector, and drying. If employed, the binder agent can be chosen from such compounds including, but not limited, to, polyvinylidene fluoride (PVDF), ethylene-propylene diene monomer (EPDM), ethylene vinyl acetate copolymer (EVA), or a combination thereof.

The positive electrode 120 or cathode can include any material compatible with the anode and can include an intercalation compound, an insertion compound, or an electrochemically active polymer. Suitable intercalation materials include, for example, lithium-containing metal oxides, $MoS_2$, $FeS_2$, $MnO_2$, $TiS_2$, $NbSe_3$, $LiCoO_2$, $LiNiO_2$, $LiMnO_2$, $LiMn_2O_4$, $V_6O_{13}$ and $V_2O_5$. Suitable polymers include, for example, polyacetylene, polypyrrole, polyaniline, and polythiophene. The positive electrode 120 or cathode can be made from a layered oxide, such as lithium cobalt oxide, an olivine, such as lithium iron phosphate, or a spinel, such as lithium manganese oxide. Examples of lithium-containing oxides can be layered, such as lithium cobalt oxide ($LiCoO_2$), or mixed metal oxides, such as $LiNi_xCo_{1-2x}MnO_2$, $LiNiMnCoO_2$ ("NMC"), $LiNi_{0.5}Mn_{1.5}O_4$, $Li(Ni_{0.8}Co_{0.15}Al_{0.5})O_2$, $LiMn_2O_4$, and doped lithium rich-layered materials, wherein x is zero or a non-zero number. Examples of phosphates include iron olivine ($LiFePO_4$) and it is variants (such as $LiFe_{(1-x)}Mg_xPO_4$), $LiMoPO_4$, $LiCoPO_4$, $LiNiPO_4$, $Li_3V_2(PO_4)_3$, $LiVOPO_4$, $LiMP_2O_7$, or $LiFe_{1.5}P_2O_7$, wherein x is zero or a non-zero number. Examples of fluorophosphates include $LiVPO_4F$, $LiAlPO_4F$, $Li_5V(PO_4)_2F_2$, $Li_5Cr(PO_4)_2F_2$, $Li_2CoPO_4F$, or $Li_2NiPO_4F$. Examples of silicates include $Li_2FeSiO_4$, $Li_2MnSiO_4$, or $Li_2VOSiO_4$, One example of a non-lithium compound is $Na_5V_2(PO_4)_2F_3$.

In one example of a Li-ion cell according to the present disclosure, lithium is contained in atomic layers of crystal structures of carbon graphite ($LiC_6$) at the negative electrode and lithium manganese oxide ($LiMnO_4$) or lithium cobalt oxide ($LiCoO_2$) at the positive electrode. In another example, the negative electrode further includes lithium absorbing materials such as silicon, and/or tin. The cell, even though shown as a planar structure, can also be formed into a cylinder by reeling the stack of layers; furthermore, other cell configurations for example, prismatic cells, button cells can be formed using the implementations described herein.

In one aspect, the separator 130 is a porous polymeric ion-conducting polymeric substrate. In one example, the porous polymeric substrate is a multi-layer polymeric substrate. Examples of separators that can be used with the implementations described herein include any commercially available polymeric microporous membranes (e.g., single or multi-ply), for example, separators produced by Polypore (Celgard LLC., of Charlotte, North Carolina), Toray Tonen (Battery separator film (BSF)), SK Energy (lithium ion battery separator (LiBS), Evonik industries (SEPARION® ceramic separator membrane), Asahi Kasei (Hipore™ polyolefin flat film membrane), and DuPont (Energain®).

In some aspects where the energy storage device 100 is a solid-state battery, the separator 130 is replaced by a Li-ion conducting glass. The Li-ion conducting material can be a Li-ion conducting ceramic or a Li-ion conducting glass. The Li-ion conducting material can include one or more of LiPON, doped variants of either crystalline or amorphous phases of $Li_7La_3Zr_2O_{12}$, doped anti-perovskite compositions, $Li_2S$—$P_2S_5$, $Li_{10}GeP_2S_{12}$, and $Li_3PS_4$, lithium phosphate glasses, $(1-x)LiI-(x)Li_4SnS_4$, $xLiI-(1-x)Li_4SnS_4$, mixed sulfide and oxide electrolytes (crystalline LLZO, amorphous $(1-x)LiI-(x)Li_4SnS_4$ mixture, and amorphous $xLiI-(1-x)Li_4SnS_4$) for example. In one example, x is between 0 and 1 (e.g., 0.1, 0.2, 0.3, 0.4, 0.5, 0.6, 0.7, 0.8, and 0.9).

In some implementations, the electrolyte infused in cell components 120, 130, and 140 can be comprised of a liquid/gel or a solid polymer and can be different in each. In one aspect, the electrolyte primarily includes a salt and a medium. In a liquid electrolyte, the medium can be referred to as a solvent; in a gel electrolyte, the medium can be a polymer matrix. The salt can be a lithium salt. Examples of the lithium salt include $LiPF_6$, $LiAsF_6$, $LiCF_3SO_3$, LiN $(CF_3SO_3)_3$, $LiBF_6$, and $LiClO_4$, BETTE electrolyte (commercially available from 3M Corp. of Minneapolis, MN) and combinations thereof. Examples of solvents include ethylene carbonate (EC), propylene carbonate (PC), EC/PC, 2-MeTHF(2-methyltetrahydrofuran)/EC/PC, EC/DMC (dimethyl carbonate), EC/DME (dimethyl ethane), EC/DEC (diethyl carbonate), EC/EMC (ethyl methyl carbonate), EC/EMC/DMC/DEC, EC/EMC/DMC/DEC/PE, PC/DME, and DME/PC. Examples of polymer matrices include PVDF (polyvinylidene fluoride), PVDF:THF (PVDF:tetrahydrofuran), PVDF:CTFE (PVDF: chlorotrifluoroethylene) PAN (polyacrylonitrile), and PEO (polyethylene oxide).

Figure 1B:
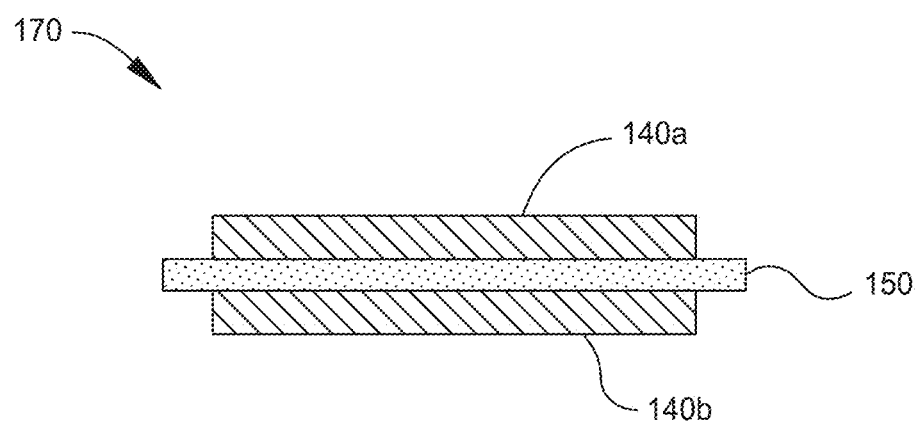
FIG. 1B illustrates a cross-sectional view of one example of a dual-sided electrode structure that is pre-lithiated according to an aspect of the present disclosure.

FIG. 1B illustrates a cross-sectional view of one example of a dual-sided electrode structure 170 that is pre-lithiated according to implementations described herein. The dual-sided electrode structure 170 includes the current collector 150 with a negative electrode structure 140a, 140b formed on opposing sides of the current collector 150. The negative electrode structures 140a, 140b are pre-lithiated according to implementations described herein.

Figure 2:
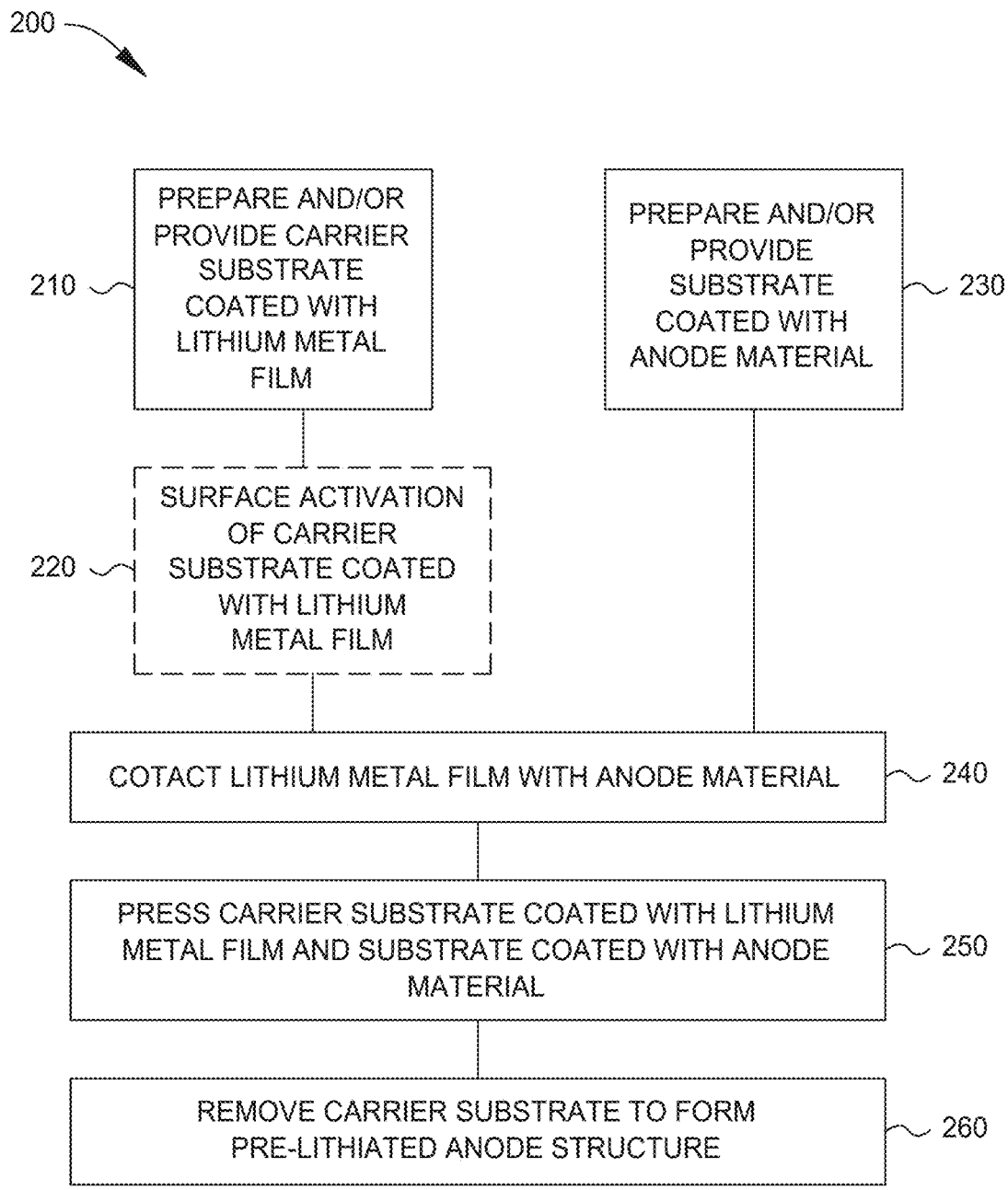
FIG. 2 illustrates a process flow chart summarizing a processing sequence for pre-lithiation of an electrode structure according to an aspect of the present disclosure.

FIG. 2 illustrates a process flow chart summarizing one implementation of a processing sequence 200 for pre-lithiation of an electrode structure according to implementations described herein. The processing sequence 200 can be used to pre-lithiate a single-sided electrode structure, for example, the electrode structure depicted in FIG. 1A, or a dual-sided electrode structure, for example, the electrode structure depicted in FIG. 1B. The processing sequence 200 can be performed using, for example, a coating system, such as the coating system 400 depicted in FIG. 4.

The processing sequence 200 begins at operation 210 by preparing and/or providing a carrier substrate coated with lithium metal. In one example, the lithium metal is a layer of lithium metal having a thickness from about 1 micron to about 50 microns, for example, from about 20 microns to about 50 microns; from about 1 micron to about 20 microns, or from about 10 microns to about 30 microns. The carrier substrate functions as a carrier substrate for carrying and transferring the lithium metal to an electrode structure. The carrier substrate can include any material suitable for carrying and transferring the lithium metal to an electrode structure. The carrier substrate can be a flexible substrate or web, which can be used in roll-to-roll coating system. In one aspect, the carrier substrate is a flexible substrate. In one example, the carrier substrate is a copper foil substrate. In another example, the carrier substrate includes a polymer material. Examples of polymer materials that can be used as the carrier substrate include, but are not limited to, polyvinylidene difluoride (PVDF), polyethylene oxide (PEO), poly-acrylonitrile (PAN), carboxymethyl cellulose (CMC), styrene butadiene rubber (SBR), ionic liquids and combinations thereof.

In one aspect, the lithium metal film is prefabricated. In one example, the prefabricated lithium metal film is a lithium foil. In another aspect, the lithium metal film is deposited on the carrier substrate. Any suitable deposition process can be used to deposit the lithium metal on the carrier substrate. Examples of suitable deposition processes include, but are not limited to, boat evaporation, e-beam evaporation, PVD sputtering, CVD coating, a slot-die coating, kiss roller coating, Meyer bar coating, gravure roller coating, or any combination thereof.

Although shown as incorporating a carrier substrate, it is also contemplated that in some aspects, the carrier substrate need not be present. In one example, where the carrier substrate is not present, a lithium metal film is provided.

At operation 220, optionally, the carrier substrate coated with lithium metal is exposed to a surface activation process. In one aspect, the surface activation process includes applying pressure to the carrier substrate coated with lithium metal film. Any suitable method for applying pressure and activating the lithium metal film can be used. In one example, the surface activation process includes applying calendering pressure.

At operation 230, a prefabricated electrode structure, which includes a substrate coated with anode material, is provided. The substrate can be a current collector as described herein. The substrate can be a flexible substrate or web, which can be used in a roll-to-roll coating system. In one aspect, the substrate is a positive current collector, such as the positive current collector 110. In another aspect, the substrate is a negative current collector, such as the negative current collector 150. In one aspect, the second substrate coated with anode material is a single-sided anode structure. In one example, the single-sided anode structure includes a copper current collector coated with a graphite anode material, a silicon anode material, or a silicon-graphite material. In another aspect, the second substrate coated with anode material is a dual-sided anode structure, such as the dual-sided electrode structure 170. In one example, the dual-sided anode structure includes a copper current collector coated on opposing sides with graphite anode material, silicon anode material, or silicon-graphite material.

At operation 240, the carrier substrate coated with lithium metal is contacted with the prefabricated electrode structure such that the lithium metal coated on the carrier substrate contacts the anode material coated on the second substrate.

At operation 250, the carrier substrate coated with lithium metal and the prefabricated electrode structure are compressed together to lithiate the prefabricated electrode. The applied pressure facilitates transfer of lithium to the prefabricated electrode structure where the lithium is incorporated into the active material of the prefabricated electrode structure. In one aspect, the carrier substrate coated with lithium metal and the prefabricated electrode structure are compressed together using a calendering process. In one aspect, the carrier substrate coated with lithium metal and the prefabricated electrode structure are compressed together in a vacuum environment. In another aspect, the carrier substrate coated with lithium metal and the prefabricated electrode structure are compressed together in an atmosphere including an inert gas. The inert gas is selected from nitrogen ($N_2$), helium (He), neon (Ne), argon (Ar), krypton (Kr), xenon (Xe), radon (Rn), or a combination thereof. In one example, the inert gas is argon gas. In another example, the atmosphere includes argon and nitrogen.

In one aspect, a pressure applied for compressing the lithium metal film to the prefabricated electrode is within a range from about 0.3 MPa to about 10 MPa, more narrowly within a range from about 0.3 MPa to about 6 MPa, more narrowly within a range from about 1 to about 4 MPa, more narrowly within a range from about 2 to about 3 MPa. In some implementations, the lithium metal film is either partially or completely intercalated into the electrode structure. For example, in some implementations, the lithium metal film is either partially or completely intercalated into a graphite electrode to form lithium carbon (LiCx). The anode electrode is generally pre-lithiated by pressing the lithium metal film to the prefabricated electrode with a magnitude of pressure insufficient to damage the prefabricated electrode. In other words, the pressure is such that the prefabricated electrode is not mechanically destroyed or degraded, such as by cracking or crushing. The pressure depends upon, for example, the active material of the prefabricated electrode and the thickness of the lithium metal film. A variety of devices can be used to apply the uniform pressure. Devices include, but are not limited to, calendering rollers and/or winding of the substrates under tension. The magnitude of pressure is generally high; however, as described above, the pressure should be of a magnitude as to not damage the prefabricated electrode. Typically, it is preferred that distribution of the pressure, during application, is as uniform as possible.

In one aspect, the operation 250 is performed at or around room temperature. In another aspect, at least one of the carrier substrate coated with the lithium metal film and/or the prefabricated electrode is heated. The carrier substrate coated with the lithium metal film and/or the prefabricated electrode can be heated to a temperature less than the melting point of lithium (180.5 degrees Celsius). In one example, the lithium metal target is heated to a temperature less than or equal to 180 degrees Celsius. In another example, the lithium metal target is heated to a temperature less than or equal to 150 degrees Celsius. In another example, the lithium metal target is heated to a temperature within a range from about 50 degrees Celsius to about 180 degrees Celsius, more narrowly within a range from about 100 degrees Celsius to about 170 degrees Celsius, and more narrowly within a range from about 100 degrees Celsius to about 150 degrees Celsius.

With the principles of the present disclosure, a quantity of lithium transferred to the electrode can be controlled by adjusting the time (duration of contact between the lithium metal film and the surface of the prefabricated electrode), pressure applied, and/or temperature. After contacting, for example, calendering, the carrier substrate coated with the lithium metal film with the prefabricated electrode in the atmosphere together, the prefabricated electrode and the carrier substrate coated with the lithium metal film can be stored in the atmosphere for a period of time. In one aspect, the period of time is sufficient to substantially or completely lithiate the prefabricated electrode. In one example, the period of time is within a range from about 1 minute to about 72 hours, more narrowly within a range from about 60 minutes to about 72 hours, and more narrowly within a range from about 6 hours to about 48 hours. The period of time sufficient to achieve targeted lithiation of the prefabricated electrode can be determined by a feedback process.

It should be understood that the heating process of operation 250 and the compression process of operation 250 can be performed simultaneously, sequentially in any order, and/or can partially overlap with each other.

At operation 260, the carrier substrate is removed to form the pre-lithiated anode structure. The separation and removal of the carrier substrate permits good control over the amount of lithium transferred, but also avoids any physical issues that can arise from the presence of a residual layer, such as small pieces fracturing and forming a physical barrier to the pores of the prefabricated electrode. In addition, the thickness of the carrier substrate allows for easy separation of the carrier substrate from the pre-lithiated electrode due to the higher cohesive forces in the solid body of the lithium metal target. After separation, the pre-lithiated electrode can be exposed to additional processing, for example, application of a protective film and/or a cooling process.

In some implementations, after separation, a passivation layer is present on the lithiated anode portion of the pre-lithiated electrode. The passivation layer can be a lithium oxide, lithium hydroxide, and/or lithium carbonate passivation layer. The passivation layer can be removed from the pre-lithiated electrode or can remain on the pre-lithiated electrode as a protective film.

Figure 3:
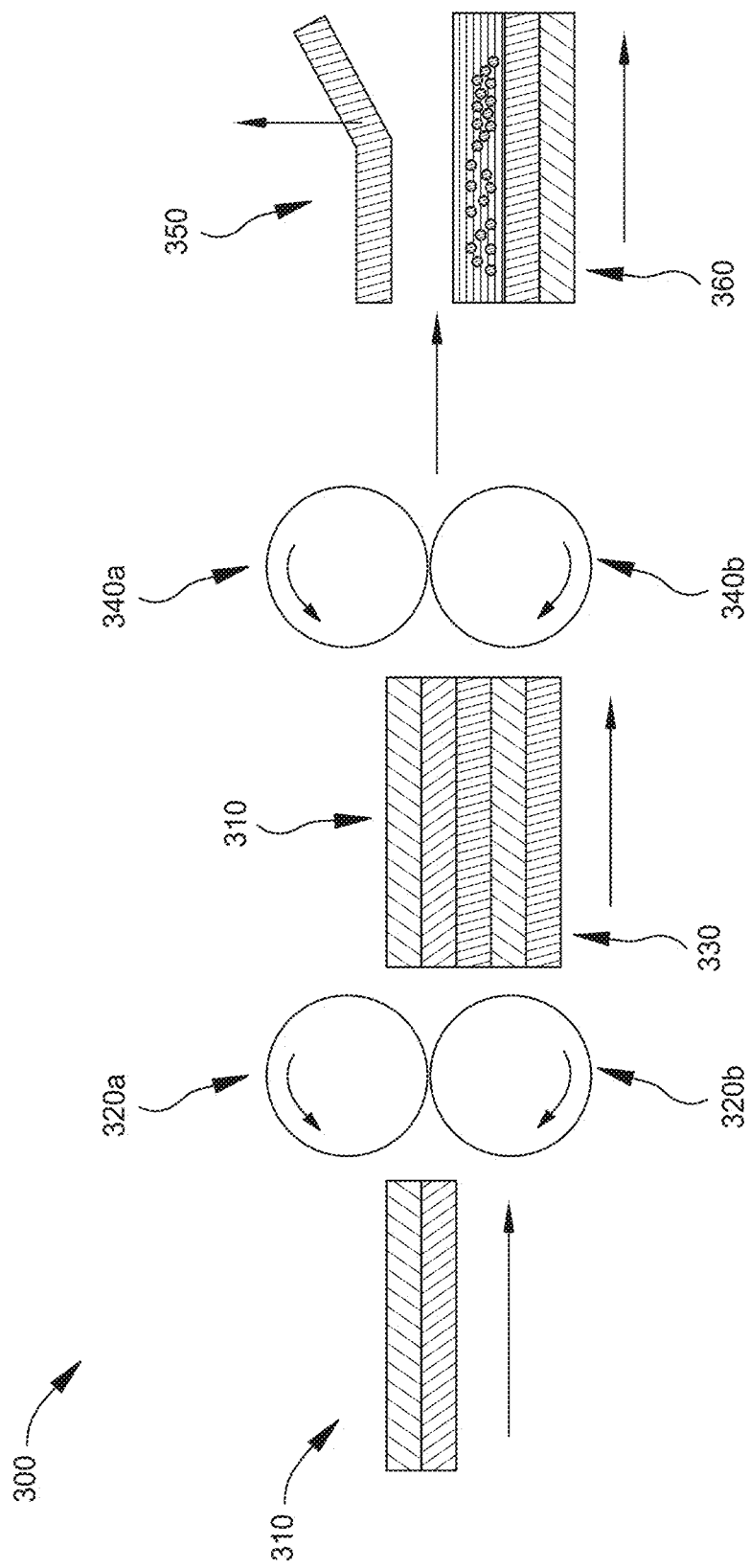
FIG. 3 illustrates a schematic view of a roll-to-roll process for forming a pre-lithiated electrode structure according to one example of the process flow chart of FIG. 2.
Figure 4:
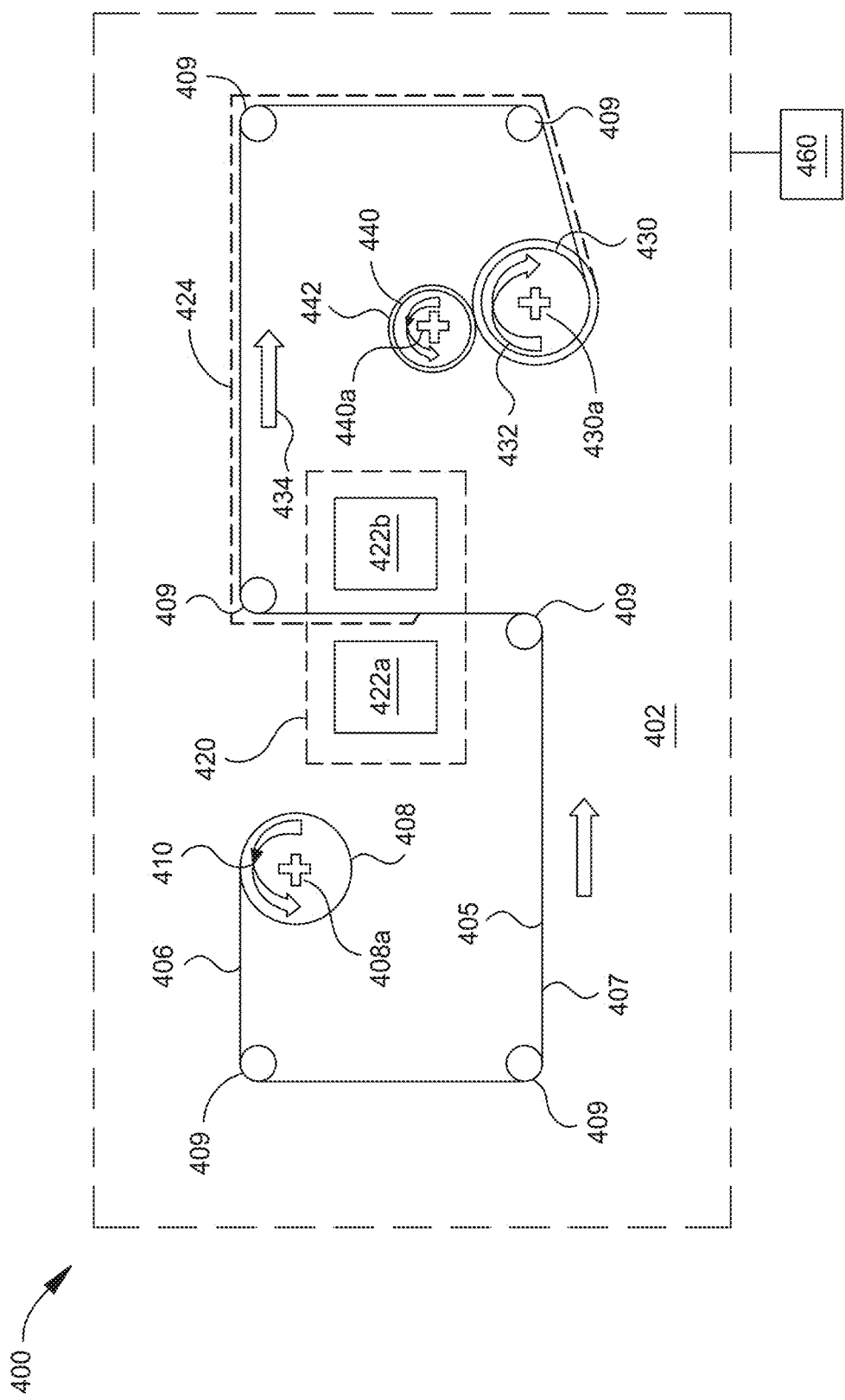
FIG. 4 illustrates a schematic cross-sectional view of one example of a roll-to-roll coating system according to an aspect of the present disclosure.
Figure 5A:
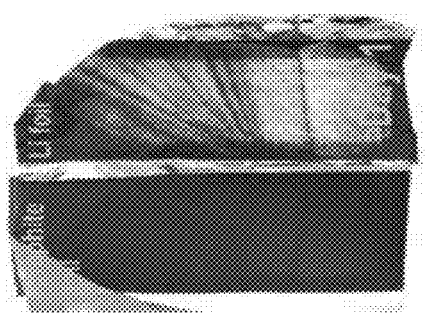
FIGS. 5A-5F depict images of cutouts of pre-lithiated samples formed by the process of FIG. 2 according to an aspect of the present disclosure.
Figure 5B:
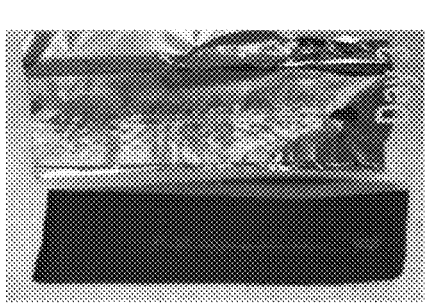
Figure 5C:
Figure 5D:
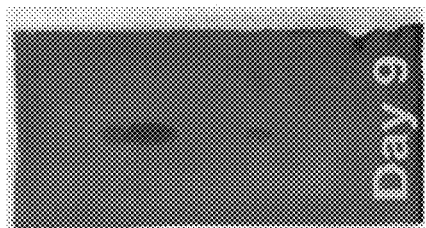
Figure 5E:
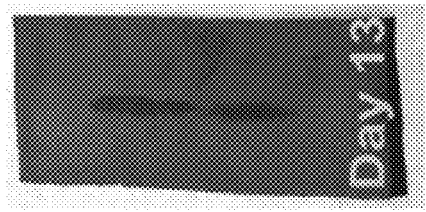
Figure 5F:
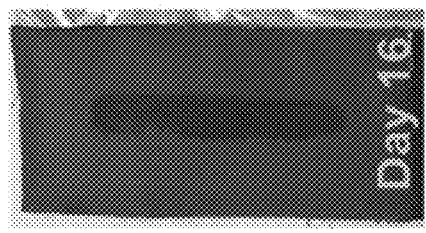

FIG. 3 illustrates a schematic view of a roll-to-roll process for forming a pre-lithiated electrode structure, for example, a pre-lithiated anode structure 360, according to one example of the process sequence 200 of FIG. 2. A carrier substrate coated with a lithium metal film 310 travels through a first pair of calendering rollers 320a, 320b to activate the lithium metal. In one example, the carrier substrate is a copper foil and the lithium metal film is a single-layer lithium foil. In one example, the lithium foil surface was first activated with the calendering process at 1,000 psi at room temperature with the lithium foil sandwiched between two polypropylene interleaf layers. Subsequently, the carrier substrate coated with the lithium metal film 310 is contacted with anode structure 330. Although, the anode structure 330 is depicted as a dual-sided anode structure, the anode structure 330 can be a single-sided anode structure. In one example, the anode structure 330 is a dual-sided graphite/copper/graphite anode. Next, the activated lithium metal film 310 is pressed onto the double-sided anode via calendering rollers 340a, 340b at various pressures. After a period of time, the carrier substrate 350 is then removed from the compressed structure to form the pre-lithiated anode structure 360.

FIG. 4A illustrates a schematic block diagram of one example of a coating system 400 according to an aspect of the present disclosure. The coating system 400 can also be referred to as a roll-to-roll coating system. The coating system 400 is adapted for pre-lithiating an electrode film according to an aspect of the present disclosure. As shown in FIG. 4A, the coating system 400 includes a common processing environment in 402 which some or all of the processing actions for pre-lithiating an electrode film can be performed. In one example, the common processing environment is operable as a vacuum environment. In another example, the common processing environment is operable as an inert gas environment. In one aspect, a carrier substrate 406 can be provided on an unwinder roller 408, which rotates in the direction of an arrow 410 when the carrier substrate 406 is being delivered. According to one aspect, the unwinder roller 408 can be driven and rotated, by the unwinder roller's own motor 408a. The carrier substrate 406 has a first side 405 and a second side 407 opposing the first side 405. Furthermore, the carrier substrate 406 can be guided over at least one guide roller 409 towards a lithium deposition region 420, which includes one or more lithium deposition sources 422a, 422b (collectively 422) adapted to deposit a lithium film 424 over the carrier substrate 406. Processing can be performed by at least one of the lithium deposition sources 422a, 422b (collectively 422) where, for example, the lithium film 424 is deposited onto the first side 405 of the carrier substrate 406. If present, the lithium deposition source 422b can be used for processing the second side 407 or a backside or the carrier substrate 406. Processing of the second side 407 of the carrier substrate 406 can include depositing a lithium film onto the second side 407 of the carrier substrate 406. In another aspect, the carrier substrate and lithium film are prefabricated and supplied together from the unwinder roller 408. In yet another aspect, the carrier substrate 406 is supplied by unwinder roller 408 and the lithium film is supplied from a second unwinder roller (not shown).

According to one implementation which can be combined with other implementations described herein, both the unwinder roller 408 operable to supply the carrier substrate 406 and a winder roller 430 operable for winding up or rewinding the processed carrier substrate 406 can be arranged in the common processing environment 402. Thus, any vacuum break between successive actions can be avoided.

According to implementations which can be combined with other implementations described herein, the one or more lithium deposition sources 422 can be selected from a boat evaporator, an e-beam evaporator, a sputtering cathode, a PVD coating source, a CVD coating source, a slot-die coating source, kiss roller, Meyer bar, gravure roller, or any combination thereof.

The carrier substrate 406 having a lithium film 424 formed on at least one side can be guided by further rollers 409, in a transport direction 434 toward the winder roller 430, which rotates in the direction of an arrow 432 when the carrier substrate 406 is being wound. According to one aspect, the winder roller 430 can be driven and rotated by the winder's own motor 430a. The use of the motor 408a of the unwinder roller 408 in coordination with the motor 430a of the winder roller 430 can be of assistance for the necessary tensioning of the carrier substrate 406. In one example, the motor 430a operates at a higher number of revs than the motor 408a, continually or at least in a determinate interval of time, so as to make the winder roller 430 rotate faster than the unwinder roller 408 and cause a tensioning effect on the carrier substrate 406. Alternatively, the motor 408a can act as a brake with respect to the motor 430a, for example in a counter-rotation, always to obtain the desired tensioning, or a proper brake can be provided, associated with the motor 408a. The tensioning can be used to control the application of pressure between the lithium film 424 and a prefabricated electrode 442 to pre-lithiate the prefabricated electrode 442.

The winder roller 430 is positioned adjacent to a prefabricated electrode supply roll 440, which supplies the prefabricated electrode 442 to be pre-lithiated by the lithium film 424 on the carrier substrate 406. According to one aspect, the prefabricated electrode supply roll 440 can be driven and rotated, by the prefabricated electrode supply roll 440 own motor 440a. As an example, the carrier substrate 406 is transported from one portion of the coating system 400 where the unwinder roller 408 is located, to another portion of the coating system 400, where the winder roller 430 and the prefabricated electrode supply roll 440 are located. As the carrier substrate 406 with the lithium film 424 is wound around the winder roller 430, the lithium film 424 contacts a surface of the prefabricated electrode 442 to pre-lithiate the prefabricated electrode 442. The pre-lithiated prefabricated electrode, which includes the carrier substrate 406 and the lithium film 424 in contact with the prefabricated electrode 442, is collected on the winder roller 430. Tensioning of the winder roller 430 can be used to control the pressure applied for compressing the lithium film 424 to the prefabricated electrode 442, which can be used to control the level of pre-lithiation of the prefabricated electrode. After pre-lithiation, the carrier substrate 406 can either be removed from the pre-lithiated electrode or remain on the pre-lithiated electrode to provide a protective coating for the pre-lithiated electrode structure.

The coating system 400 further includes a system controller 460 operable to control various aspects of the coating system 400. The system controller 160 facilitates the control and automation of the overall coating system 400 and can include a central processing unit (CPU), memory, and support circuits (or I/O). Software instructions and data can be coded and stored within the memory for instructing the CPU. The system controller 460 can communicate with one or more of the components of the coating system 400 via, for example, a system bus. A program (or computer instructions) readable by the system controller 460 determines which tasks are performable on a substrate. In some aspects, the program is software readable by the system controller 460, which can include code to control removal and replacement of the multi-segment ring. Although shown as a single system controller 460, it should be appreciated that multiple system controllers can be used with the aspects described herein.

EXAMPLES

The following non-limiting examples are provided to further illustrate implementations described herein. However, the examples are not intended to be all inclusive and are not intended to limit the scope of the implementations described herein.

A single-layer lithium foil of requisite thickness on a copper foil was used as the lithium source. The lithium foil had a thickness of approximately 25-35 um and the copper foil had a thickness of approximately 10-12 um. The lithium foil surface was first activated with a calendering process at 1,000 psi at room temperature with the lithium foil sandwiched between two polypropylene interleaf layers. Subsequently, the activated lithium foil was pressed onto a double-sided graphite/copper/graphite (GR/CU/GR) anode and processed at various pressures.

Using the lithium foil ~25-35 um on copper foil resulted in a complete transfer of lithium onto the graphite anode layer. The net lithium uptake of the graphite was roughly equal to the thickness of the lithium soil. A similar complete uptake of the source lithium was also observed at elevated temperatures as shown in Table I below. Table I depicts thickness measurements of pre-lithiated samples demonstrating the complete uptake of lithium at various calendering temperatures. The thickness observed after the pre-lithiation is that of the bare Cu substrate that is approximately 10-12 um thick, which demonstrates that all of the lithium has been transferred from the copper substrate to the GR/CU/GR anode. "LI/CU" represents the thickness of a lithium foil on a copper substrate both before and after calendering. "GR/CU/GR" represents the thickness of a dual-sided GR/CU/GR anode before and after calendering the GR/CU/GR anode with the LI/CU foil.

TABLE I

| FOIL TYPE | | LI/CU | GR/CU/GR |
| --- | --- | --- | --- |
| Room T | Before | 34-40 | 130-140 |
| | After | 10-12 | 156-167 |
| 75° C. | Before | 21-25 | 135-145 |
| | After | 10-12 | 152-162 |
| 120° C. | Before | 21-25 | 135-145 |
| | After | 10-12 | 152-162 |

FIGS. 5A-5F depict images of cutouts of pre-lithiated samples formed by the process of FIG. 2 and calendered at room temperature according to an aspect of the present disclosure. For images of the room-temperature samples depicted in FIG. 5A, the graphite peeled off immediately after processing and showed no color change. Most of the Li remained on the Li/Cu side. As demonstrated in FIG. 5B, for the sample peeled off 72 hours after processing, the graphite anode took up almost all the lithium on the Li/Cu side, and the color of the graphite changed to dark yellow, which is a distinct characteristic of lithiated graphite. Graphite exhibits a color change to various shades of golden yellow upon complete lithiation. As shown in FIGS. 5C-5F, starting from 144 hours, the peeled off samples had a golden-yellow color, which corresponds to the characteristic color of the graphite-intercalated-compound (GIC) $LiC_6$.

Figure 6A:
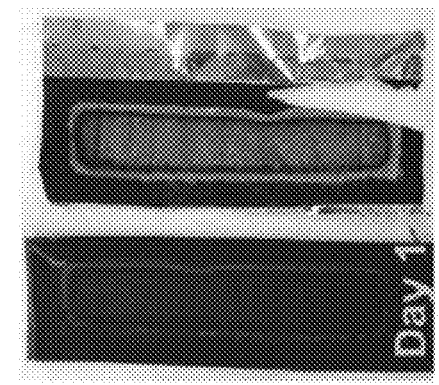
FIGS. 6A-6D depict images of cutouts of pre-lithiated samples formed by the process of FIG. 2 according to an aspect of the present disclosure.
Figure 6B:
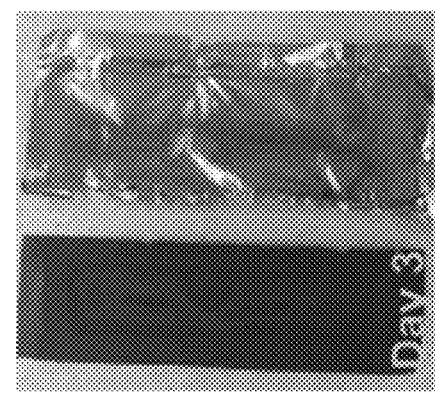
Figure 6C:
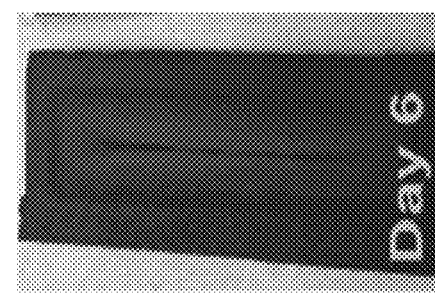
Figure 6D:
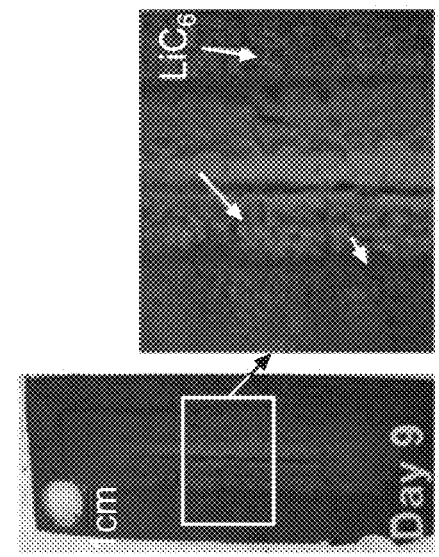

FIGS. 6A-6D depict images of cutouts of pre-lithiated samples formed by the process of FIG. 2 and calendered at 75° C. according to an aspect of the present disclosure. For the samples calendered at 75° C., a more significant color change of graphite was noticed after peeling off the lithium source. Starting from the third day, as shown in FIG. 6B, the peeled off samples had a golden-yellow color. The non-uniform color of the graphite sample showed in the inserted figures in FIG. 6D implied the existence of other Li intercalated compounds such as $LiC_{12}$ or $LiC_{18}$. Similar co-existing compounds were also identified in the samples calendered at 120° C.

Figure 7D:
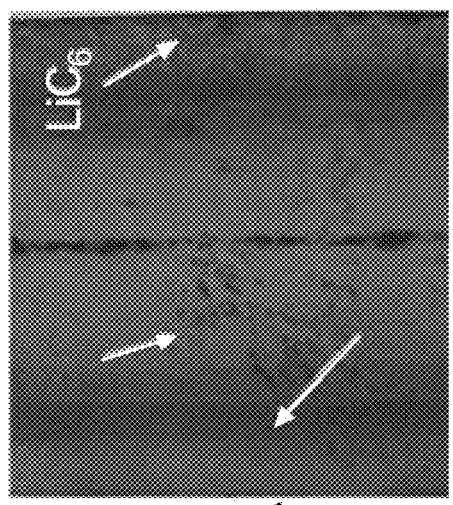
FIGS. 7A-7D depict images of cutouts of pre-lithiated samples formed by the process of FIG. 2 according to an aspect of the present disclosure.
Figure 7C:
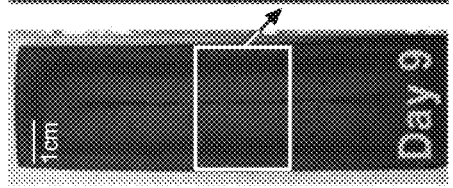
Figure 7B:
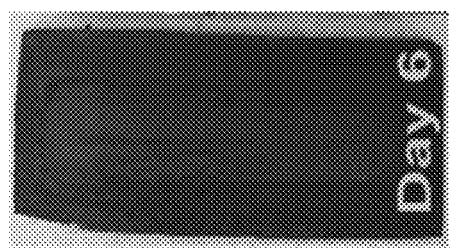
Figure 7A:
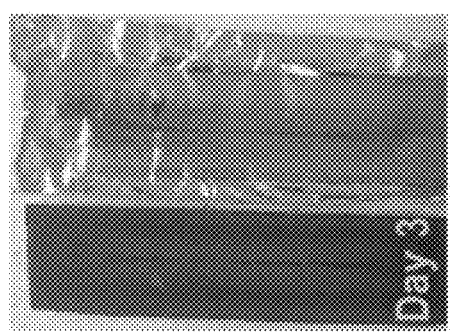

FIGS. 7A-7D depict images of cutouts of pre-lithiated samples formed by the process of FIG. 2 and calendered at 120° C. according to an aspect of the present disclosure. Starting from the third day, as shown in FIG. 7B, the peeled off samples had a golden-yellow color. In addition, the non-uniform color of the graphite sample exhibited in FIG. 6D implied the existence of other lithium intercalated compounds such as $LiC_{12}$ or $LiC_{18}$.

Figure 8:
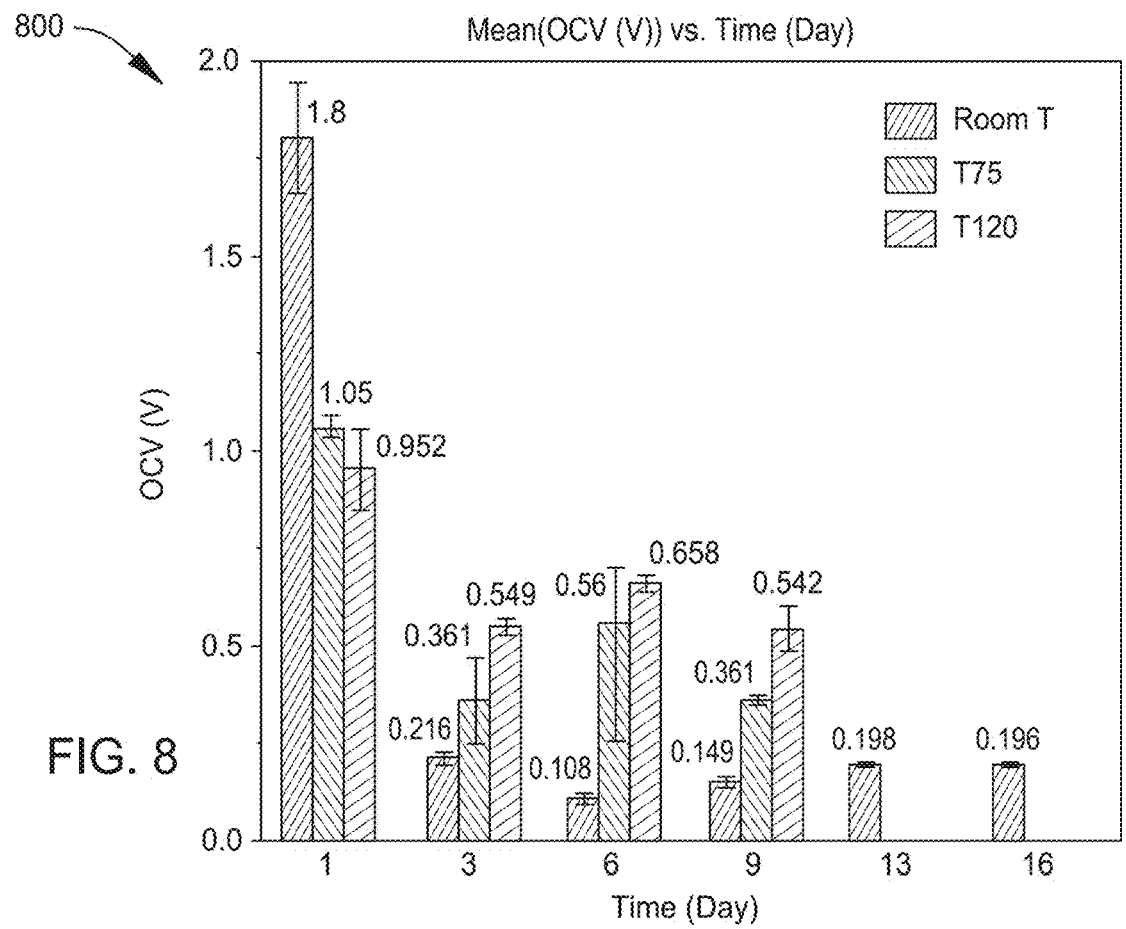
FIG. 8 illustrates a plot depicting the open-circuit voltage for half-cells including pre-lithiated graphite formed according to aspects of the present disclosure.
Figure 9:
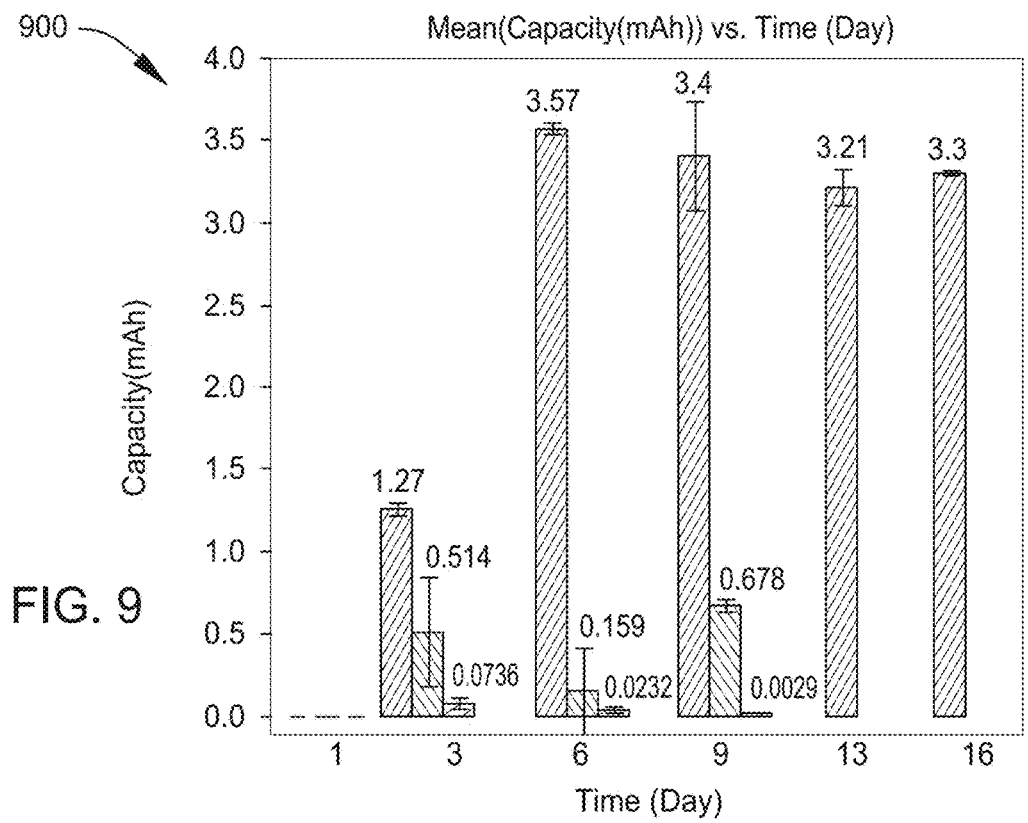
FIG. 9 illustrates a plot depicting the de-intercalation charging capacity of half-cells including pre-lithiated graphite formed according to aspects of the present disclosure.

FIG. 8 illustrates a plot 800 depicting the open-circuit voltage ("OCV") for half-cells including pre-lithiated graphite formed according to aspects of the present disclosure. FIG. 9 illustrates a plot 900 depicting the de-intercalation charging capacity of half-cells including pre-lithiated graphite formed according to aspects of the present disclosure. The electrochemical performance of the pre-lithiated electrodes are depicted in plot 800 shown in FIG. 8 and plot 900 shown in FIG. 9, respectively. A pristine graphite anode was used as a control with identical cell configuration. For the control sample, the OCV was around 2.7-2.9 V, with 0 $mAh/cm^2$ of Li-intercalated capacity. Samples, which peeled off immediately after calendering showed a decreased voltage (>1 V) when compared to the control, implying a significant lithium uptake was achieved right after calendering. The room temperature processed sample had the highest OCV among the three. Samples calendered at the higher temperatures of 75° C. and 120° C. demonstrated an instant OCV of around 1 V. This observation was consistent with the color change observed for the first-day sample calendered at 120° C., which exhibited the most significant color change. With prolonged aging, the pre-lithiated samples exhibited a similar decreasing trend in measured OCV, corresponding to the fact that Li intercalation was enhanced with increasing contact time between Li source and graphite host.

The room temperature samples had the lowest OCV of around 0.11 V when peeled off on the sixth day after calendering. This voltage was very close to the stage-1 graphite intercalation compound (GIC) $LiC_6$ plateau, which is usually observed at around 0.085 V. Calendering at higher temperatures elevated the OCV after the third day.

Analysis of FIG. 9 demonstrated that the pre-lithiated capacity was roughly in inverse proportion to the OCV. On the first day after processing, all samples had zero capacity as the OCV was well above 0.75 V. For the room temperature processed samples, a significant capacity enhancement was demonstrated after the third day. The sample on the sixth day had a capacity of 3.57 mAh on the ½" OD graphite electrode. The specific capacity was calculated to be 2.81 $mAh/cm^2$, which corresponded to 13.8 um of Li uptake assuming all the GIC was $LiC_6$. The calculated Li intercalation thickness was only half of the total bulk lithium uptake by the graphite anode, implying the active lithium conversion was around 50% at the sixth day. Aging the room temperature sample with longer contact time did not further improve the capacity.

For samples processed at elevated temperatures, the capacity was much lower than samples processed at room temperature. This observation was consistent with the previous digital photo results that less light-yellow area ($LiC_6$) was obtained with high temperature processing. At the same time, the higher OCV before the cell charging process also implied a less Li-intercalated graphite at higher processing temperatures.

Figure 10A:
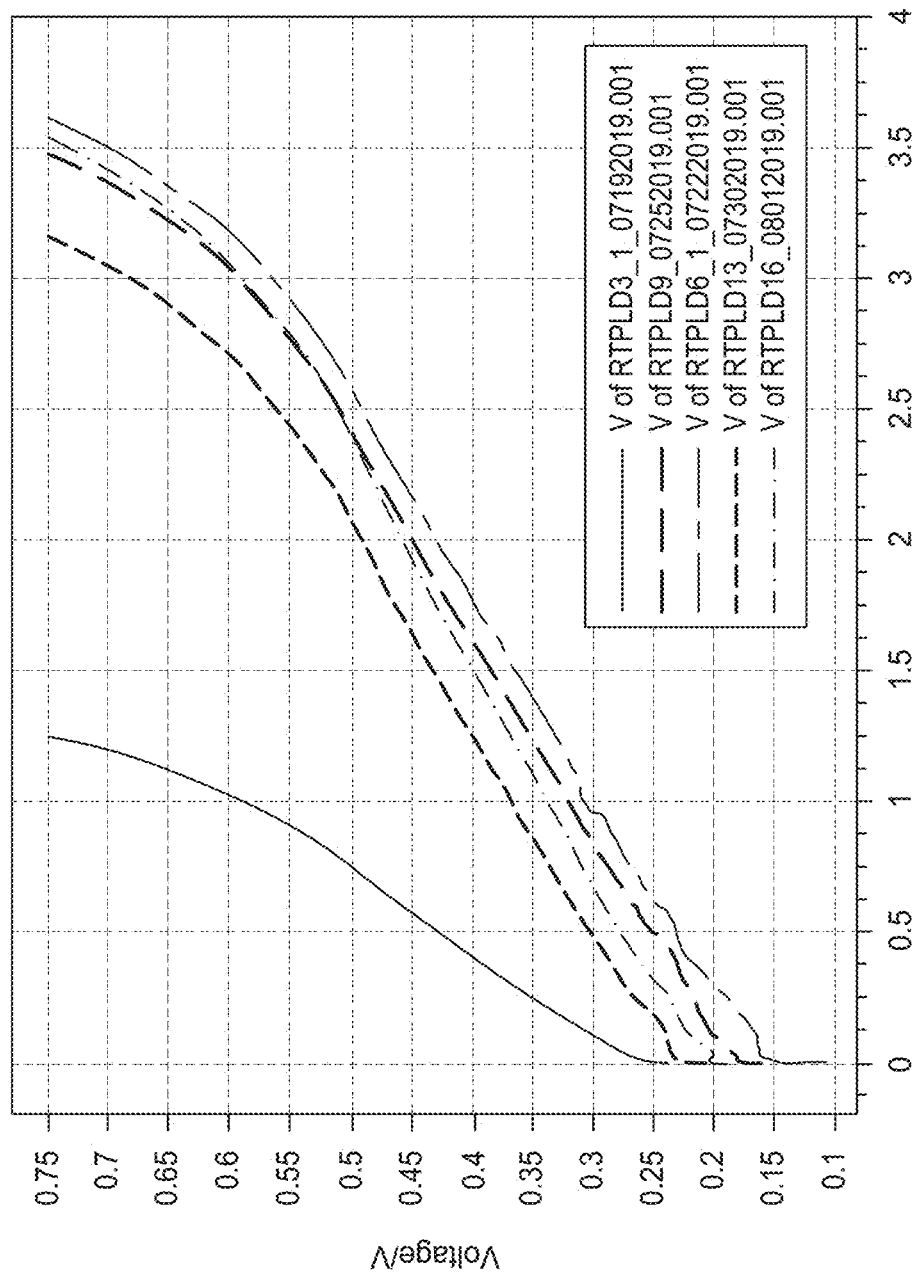
FIG. 10A illustrates a plot depicting the charging profile of a pre-lithiated graphite|lithium half-cell formed according to aspects of the present disclosure.
Figure 10B:
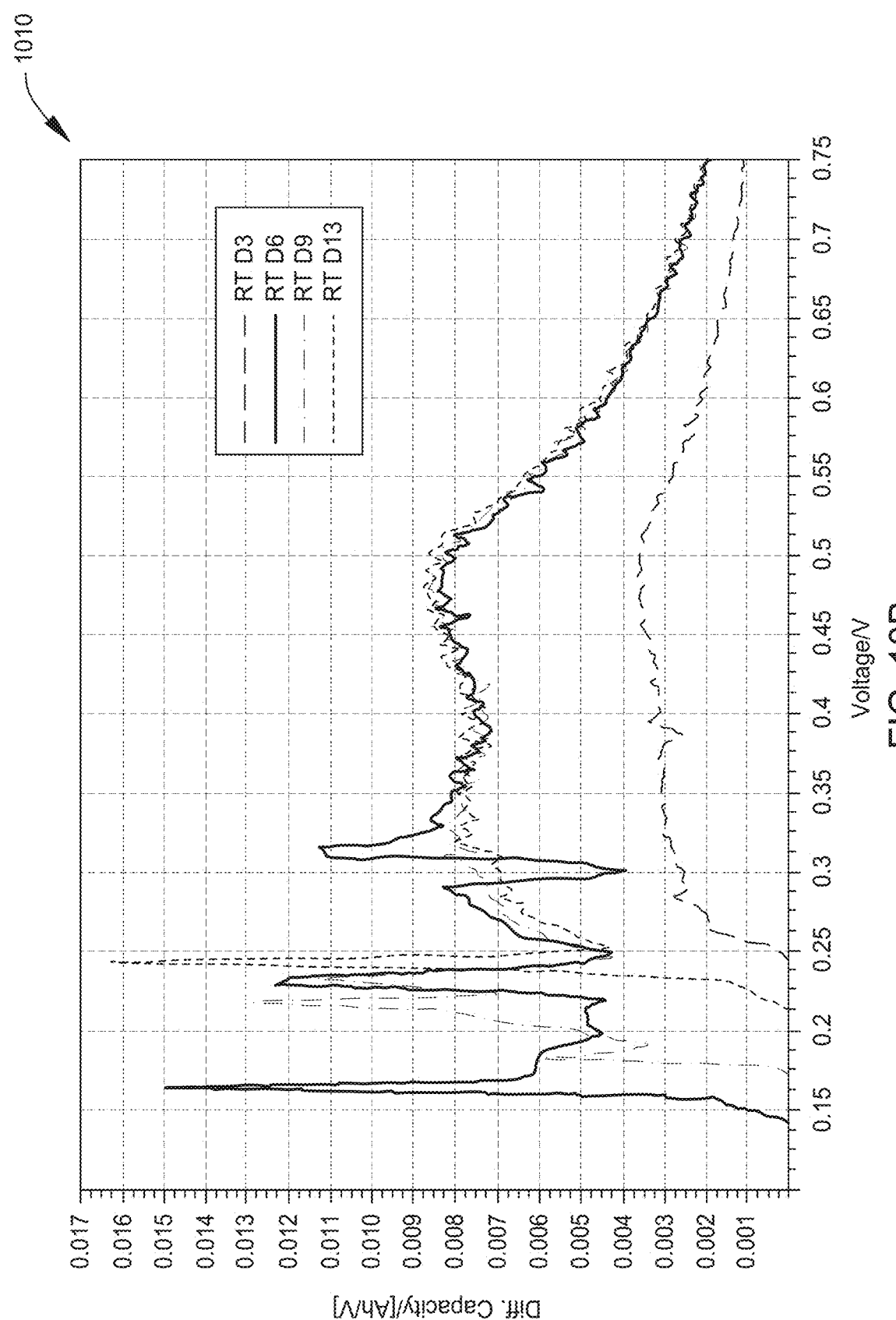
FIG. 10B illustrates a plot depicting the differential capacity with respect to an anode potential curve of a pre-lithiated graphite|lithium half-cell formed according to aspects of the present disclosure.

FIG. 10A illustrates a plot 1000 depicting the charging profile of a pre-lithiated graphite|lithium half-cell formed according to aspects of the present disclosure. FIG. 10B illustrates a plot 1010 depicting the differential capacity with respect to an anode potential curve of a pre-lithiated graphite|lithium half-cell formed according to aspects of the present disclosure. FIGS. 10A and 10B summarize the electrochemical behavior of room temperature processed samples with lithium as the counter electrode as described earlier. The samples, which peeled off after the sixth day of processing had a similar charging profile and the capacity was between 3-3.5 mAh. The samples also demonstrated different charging plateaus as shown in FIG. 10B. The lowest plateau was observed for the sixth day sample at around 0.16 V, which corresponds to the transition between stage-2 ($LiC_{18}$) to stage-3. Not to be bound by theory but it is believed that the higher voltage plateaus around 0.22 V might represent the transition from stage-4 to dilute stage-1. No stage-2 GIC to stage-1 GIC plateau (<0.9 V) was observed in the pre-lithiated samples.

Figure 11A:
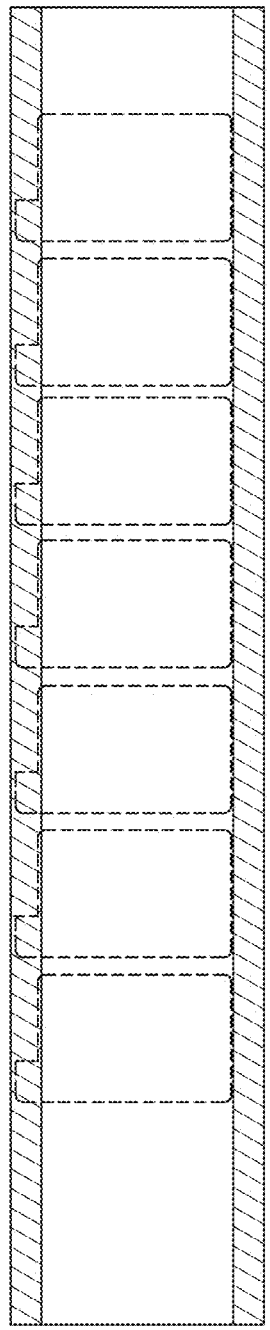
FIG. 11A illustrates a schematic top view of electrode stamping on a coated web according to an aspect of the present disclosure.
Figure 11B:
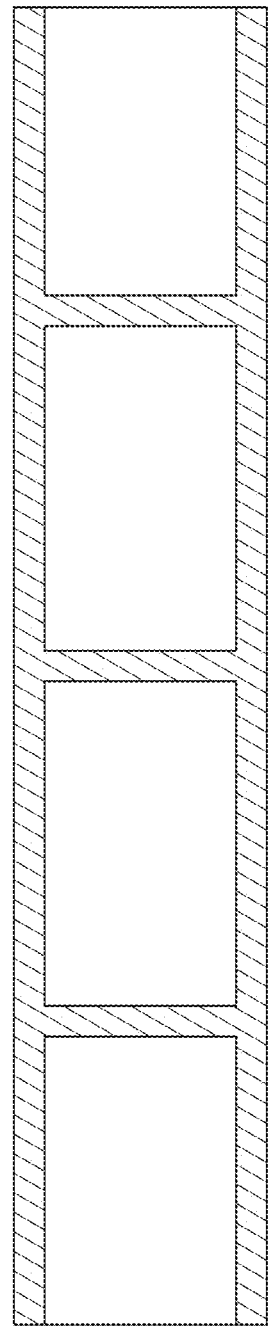
FIG. 11B illustrates a schematic top view of a patterned lithium film according to an aspect of the present disclosure.

FIG. 11A illustrates a schematic top view of electrode stamping on a coated web 1100 according to an aspect of the present disclosure. FIG. 11B illustrates a schematic top view of a lithium patterned film 1110 according to an aspect of the present disclosure. For all electrodes, during the stamping process, a cutout area (often referred to as tab area) of uncoated substrate is typically used for the purposes of cell stacking. The example shown in FIG. 11A is of a stamping process where the electrode length and the coating width have a near correlation. However, as the coating width increases and based on the form factor of the batteries manufactured, the system will have to have cutout areas in between the normal evaporation area for maximum areal utilization. Under such cases, patterned deposition such as shown in FIG. 11B will be beneficial. In this particular instance, a simple intermittent gap pattern is used. Based on the end use, complex patterns can be adopted. The formation of such patterns in a continuous web setup is especially complicated for pre-lithiation. By utilizing a direct contact approach, one can utilize a continuously coated lithium substrate in conjunction with a patterned anode. Under such a scenario, the two layers can either be calendered between suitable rollers or can be wound together such as in a conventional roll-to-roll setup wherein an interleaf material is utilized to prevent contact between the substrate layers.

In one aspect of the present disclosure, direct contact pre-lithiation can be used in conjunction with a thermal evaporation-based process wherein a lithium layer is continuously coated onto a carrier substrate and then wound together with an anode layer mimicking an interleaf. The pre-lithiation then occurs in the wound state. Thus, one can take the advantages of a thermal evaporation process such as uniformity, a pure lithium layer combined with the ease of direct contact pre-lithiation without subjecting the anode and its components to reactive lithium vapor. The edge definition of an anode is maintained as is after direct contact pre-lithiation.

Figure 12B:
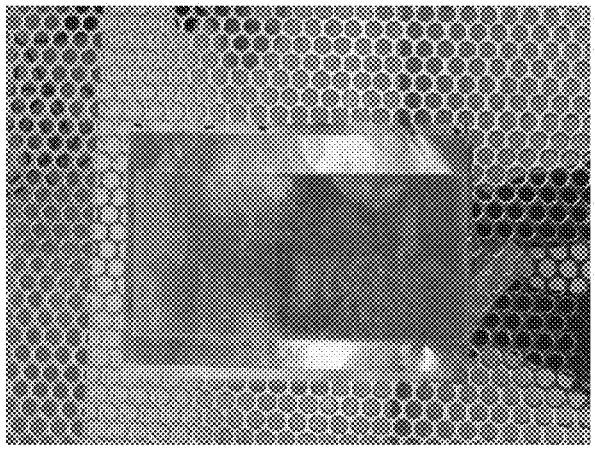
FIG. 12B depicts an optical image of an anode after pre-lithiation according to an aspect of the present disclosure.
Figure 12A:
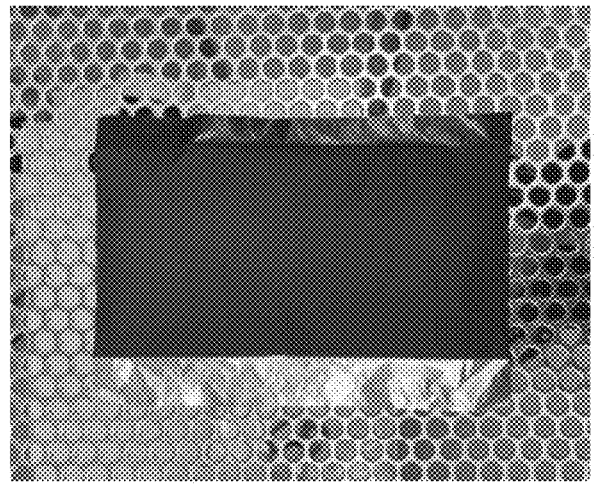
FIG. 12A depicts an optical image of a lithium coated substrate according to an aspect of the present disclosure.

FIG. 12A depicts an optical image 1200 of a lithium coated carrier substrate according to an aspect of the present disclosure. FIG. 12B depicts an optical image 1210 of an anode after pre-lithiation according to an aspect of the present disclosure. The optical image 1200 depicts a lithium substrate on copper showing complete uptake of Li after staying in direct contact with an anode material for 72 hours and the optical image 1210 depicts an anode after pre-lithiation showing no lithium uptake on the copper area. The edge definition under a laser microscope analysis was revealed to be 346 µm. The edge observed was the Li|Cu crossover interface where the lithium was completely absorbed from the lithium substrate by the anode. It was also observed that during this direct contact process only the lithium contacting the anode material is absorbed by the anode material. The remainder of the lithium that contacts the copper substrate of the anode material does not transfer onto the anode. This is quintessential to maintaining the pattern on the anode. Hence, using direct contact pre-lithiation as described in the present disclosure enables the use of an interleaf material (any suitable polymer) on an evaporation system that will be subsequently wound together with the anode under tension. Upon transferring the roll onto an assembly line, when the interleaf material is removed the anode with the required pre-lithiation is then fabricated into a battery pack.

Implementations can include one or more of the following advantages. The pre-lithiation processes described herein are enabled by direct contact between lithium metal coated on a substrate and electrode material, which is coated on a substrate, while controlling at least one of temperature and pressure between the lithium target and the coated electrode. The residence time for pre-lithiation of the coated electrodes described herein is controlled and shortened by controlling temperature and/or pressure. Pre-lithiation of coated electrodes allows for, among other things, an increase in the Li-ion battery energy density (kWh), and reduction of the cathodic coating loading for the anode/cathode balancing, specifically the costly elements of cobalt and nickel. Thus, the pre-lithiation process described herein has a direct impact on the main figure of merit, cost per kWh, used in the Li-ion battery manufacturing. The pre-lithiation process described herein is suitable for any coated negative or positive electrodes. The pre-lithiation processes described herein provide battery manufacturers with greater flexibility in cell balancing, independently matching reversible anode/cathode capacities and irreversible anode/cathode capacities. In addition, the pre-lithiation techniques described herein are capable of seamlessly slotting into current battery production lines.

Implementations and all of the functional operations described in this specification can be implemented in digital electronic circuitry, or in computer software, firmware, or hardware, including the structural means disclosed in this specification and structural equivalents thereof, or in combinations of them. Implementations described herein can be implemented as one or more non-transitory computer program products, i.e., one or more computer programs tangibly embodied in a machine readable storage device, for execution by, or to control the operation of, data processing apparatus, e.g., a programmable processor, a computer, or multiple processors or computers.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. Processors suitable for the execution of a computer program include, by way of example, both general and special purpose microprocessors, and any one or more processors of any kind of digital computer.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there can be additional elements other than the listed elements.

While the foregoing is directed to implementations of the present disclosure, other and further implementations of the disclosure can be devised without departing from the basic scope thereof, and the scope thereof is determined by the claims that follow.

The invention claimed is:

1. A method of fabricating a pre-lithiated electrode, comprising:
disposing a carrier substrate comprising a layer of lithium metal adjacent to a prefabricated electrode comprising a layer of anode material, wherein the carrier substrate is provided by an unwinder roller and the prefabricated electrode is provided by a prefabricated electrode supply roller, wherein the unwinder roller comprises an unwinder roller motor;
contacting a surface of the layer of anode material with a surface of the layer of lithium metal by winding the carrier substrate with the prefabricated electrode on a winder roller adjacent to the prefabricated electrode supply roller, wherein the carrier substrate and the prefabricated electrode are disposed on the winder roller and the winder roller comprises a winder roller motor; and
calendering the layer of lithium metal and the prefabricated electrode together by positioning the layer of lithium metal and the prefabricated electrode between the prefabricated electrode supply roller and the winder roller, and producing a tensioning of the carrier substrate by operating the winder roller motor at a higher number of revolutions than the unwinder roller motor.

2. The method of claim 1, further comprising:
separating the carrier substrate from the surface of the layer of anode material to form the pre-lithiated electrode.

3. The method of claim 1, wherein calendering the layer of lithium metal comprises applying uniform pressure to a back surface of the carrier substrate.

4. The method of claim 3, wherein the uniform pressure is a pressure ranging from 0.3 MPa to 10 MPa.

5. The method of claim 1, further comprising heating at least one of the carrier substrate comprising the layer of lithium metal or the prefabricated electrode to a temperature.

6. The method of claim 5, wherein the temperature is within a range from 50 degrees Celsius to 180 degrees Celsius.

7. The method of claim 1, wherein the prefabricated electrode is a negative electrode comprising a carbonaceous material, silicon, tin, or combinations thereof.

8. The method of claim 7, wherein the carbonaceous material is selected from natural graphite, artificial graphite, or combinations thereof.

9. The method of claim 1, wherein the layer of lithium metal has a thickness from 1 micron to 50 microns.

10. The method of claim 1, wherein calendering the layer of lithium metal and the prefabricated electrode together is performed in an atmosphere comprising a noble gas.

11. The method of claim 1, wherein calendering the layer of lithium metal and the prefabricated electrode together is performed in a vacuum environment.

12. The method of claim 1, further comprising incorporating the pre-lithiated electrode into an electrochemical cell further comprising a positive electrode, a separator, and an electrolyte.

13. The method of claim 1, further comprising controlling a uniform pressure between the layer of lithium metal and the prefabricated electrode by adjusting the tensioning of the carrier substrate.

14. The method of claim 1, further guiding the carrier substrate to the winder roller using a guide roller.

15. A method of fabricating a pre-lithiated electrode, comprising:
depositing a layer of lithium metal on a carrier substrate;
disposing the carrier substrate adjacent to a prefabricated electrode comprising a layer of anode material, wherein the carrier substrate is provided by an unwinder roller and the prefabricated electrode is provided by a prefabricated electrode supply roller;
contacting a surface of the layer of anode material with a surface of the layer of lithium metal by winding the carrier substrate with the prefabricated electrode on a winder roller adjacent to the prefabricated electrode supply roller, wherein the carrier substrate and the prefabricated electrode are disposed on the winder roller; and
calendering the layer of lithium metal and the prefabricated electrode together by positioning the layer of lithium metal and the prefabricated electrode between the prefabricated electrode supply roller and the winder roller.

16. The method of claim 15, wherein depositing the layer of lithium metal on the carrier substrate comprises using a deposition process selected from the group consisting of thermal evaporation, boat evaporation, e-beam evaporation, PVD sputtering, CVD coating, slot-die coating, kiss roller coating, Meyer bar coating, or gravure roller coating.

17. The method of claim 16, wherein the deposition process is thermal evaporation.

18. The method of claim 15, wherein the layer of lithium metal has a thickness from 1 micron to 50 microns.

19. A method of fabricating a pre-lithiated electrode, comprising:
depositing a layer of lithium metal on a carrier substrate using thermal evaporation;
disposing the carrier substrate adjacent to a prefabricated electrode comprising a layer of anode material, wherein the carrier substrate is provided by an unwinder roller and the prefabricated electrode is provided by a prefabricated electrode supply roller;
contacting a surface of the layer of anode material with a surface of the layer of lithium metal by winding the carrier substrate with the prefabricated electrode on a winder roller adjacent to the prefabricated electrode supply roller, wherein the carrier substrate and the prefabricated electrode are disposed on the winder roller; and
calendering the layer of lithium metal and the prefabricated electrode together by positioning the layer of lithium metal and the prefabricated electrode between the prefabricated electrode supply roller and the winder roller.

20. The method of claim 19, wherein the layer of lithium metal has a thickness from 1 micron to 50 microns.

21. The method of claim 19, further comprising producing a tensioning of the carrier substrate by operating the winder roller motor at a higher number of revolutions than the unwinder roller motor.

* * * * *